Aug. 22, 1939.   H. R. SCHUTZ   2,170,610
BANDING APPARATUS
Filed Nov. 18, 1937   2 Sheets-Sheet 2
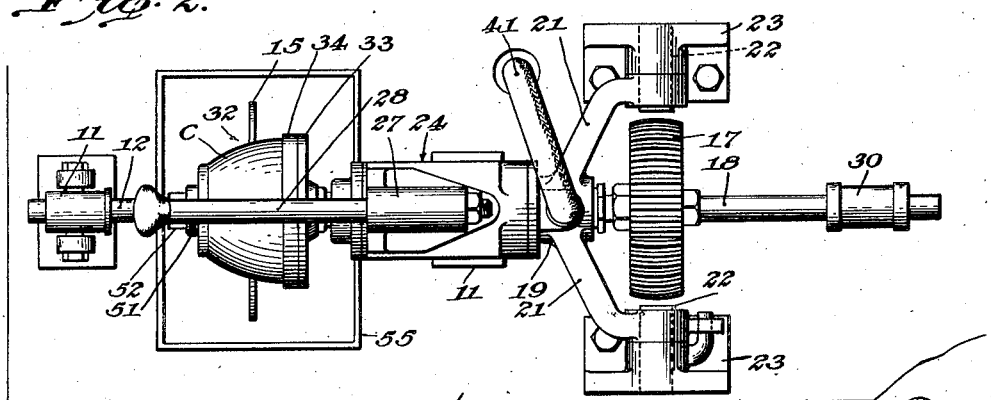
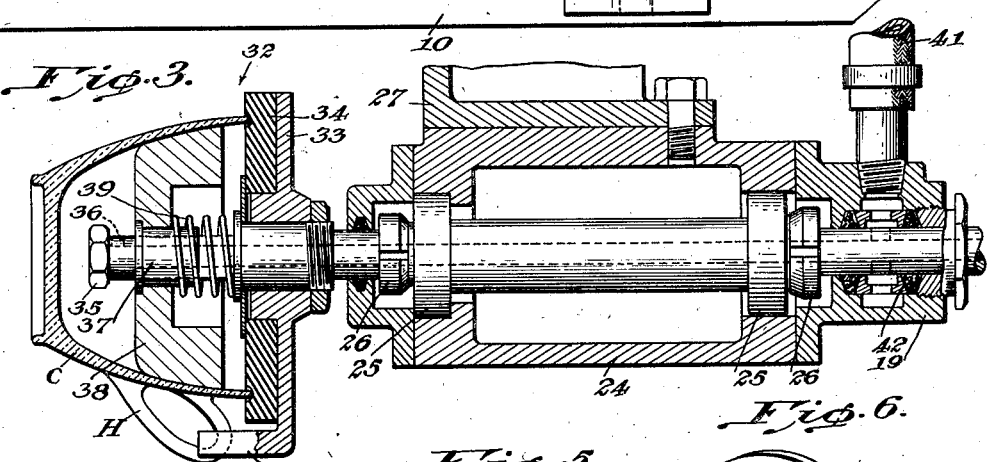
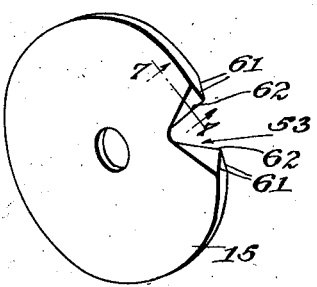
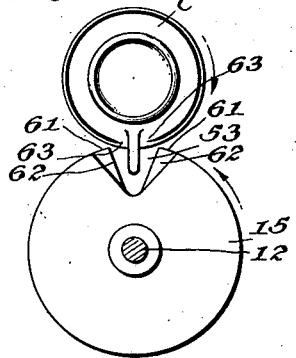
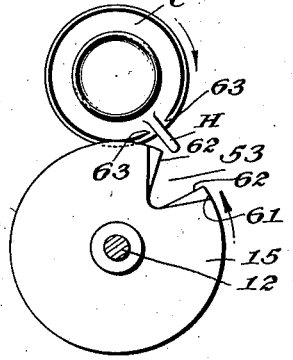
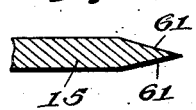
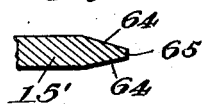
INVENTOR.
H. R. Schutz,
BY Rule & Hoge
ATTORNEYS.

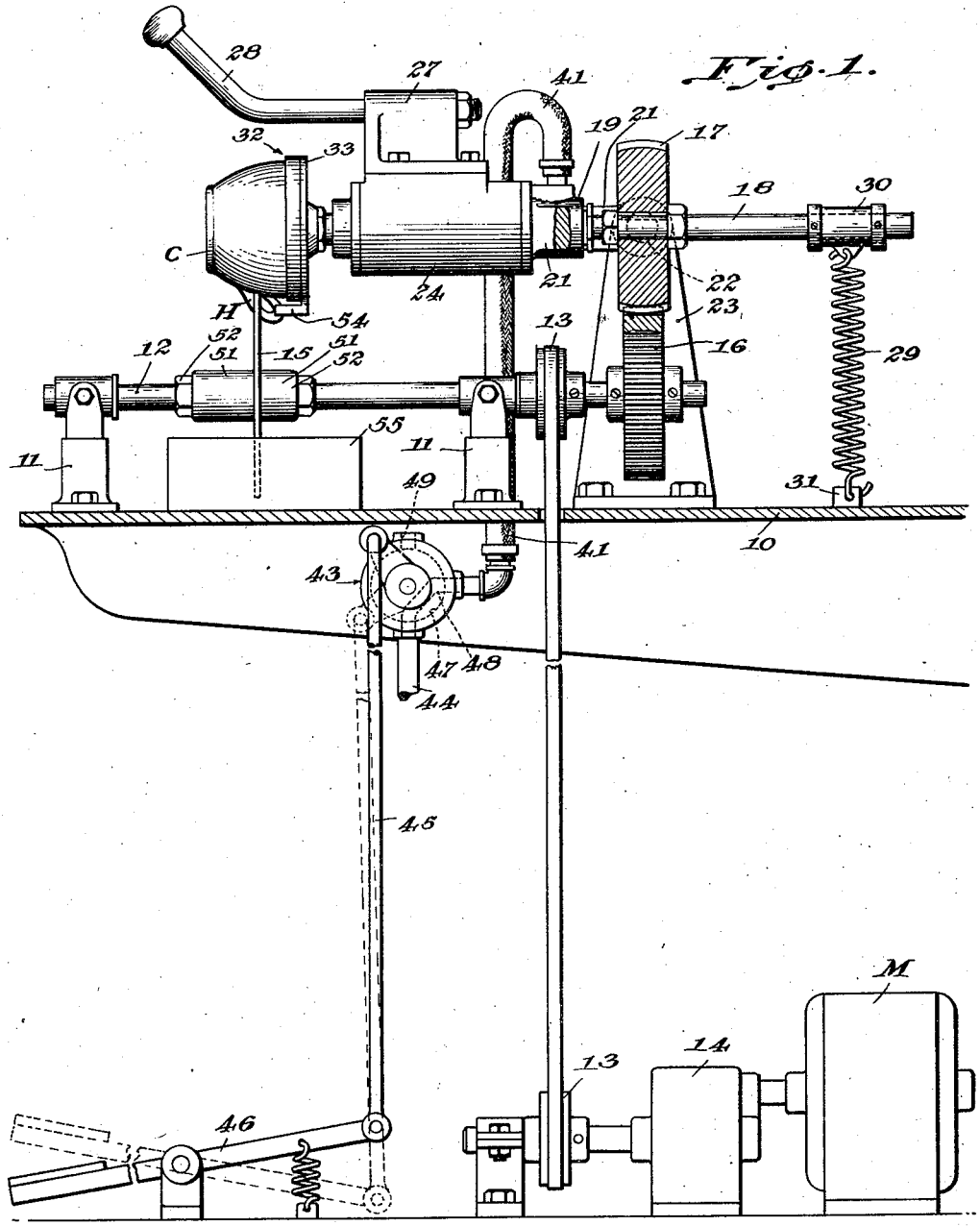

Patented Aug. 22, 1939

2,170,610

UNITED STATES PATENT OFFICE 2,170,610

BANDING APPARATUS

Harold R. Schutz, Toledo, Ohio, assignor to Libbey Glass Company, a corporation of Ohio Application November 18, 1937, Serial No. 175,242

7 Claims. (Cl. 91—12)

The present invention relates to an apparatus for banding or decorating articles.

The principal object of the invention is to provide an apparatus for automatically decorating cups and similar articles having handles which will apply to the articles an interrupted band of vitreous enamel or other decorating material, the interruptions in which terminate close to the handle on opposite sides thereof.

Another object of the invention is to provide such an apparatus which will apply the interrupted bands to the articles by a process wherein the article undergoing decoration is maintained in tangential rolling line contact with a banding wheel, by means of which the decorating material is applied to the article.

Yet another object of the invention is to provide a banding wheel for applying interrupted bands to cups and similar articles having handles in which provision is made for preventing spreading of the applied decorating material at the interruption in the band.

A still further object of the invention is to provide such an apparatus in which provision is made for automatically orienting the articles as they are introduced thereto in order that the interrupted ends of the bands applied to the articles shall straddle the handles thereof and occupy positions close to the handles on opposite sides thereof.

Other objects of the invention will become apparent hereinafter.

In the accompanying drawings:

Fig. 1 is a side elevational view, partly in section, of a banding apparatus constructed in accordance with the principles of the present invention;

Fig. 2 is a top plan view thereof;

Fig. 3 is an enlarged fragmentary vertical sectional view, partly in elevation, taken through a vacuum chuck mechanism employed in connection with the invention;

Figs. 4 and 5 are similar diagrammatic views illustrating the manner in which the interrupted bands are applied to the articles by the banding wheel;

Fig. 6 is a perspective view of a banding wheel constructed in accordance with the principles of the invention;

Fig. 7 is a sectional view taken substantially along the line 7—7 of Fig. 6; and Fig. 8 is a sectional view similar to Fig. 7 showing a modified form of banding wheel.

Referring now to Fig. 1, a support 10 or platform has mounted thereon a pair of floating hangers 11 between which are rotatably supported a shaft 12, hereinafter referred to as a decorating shaft, which is adapted to be continuously driven by means of a belt and pulley connection 13 from a motor M disposed below the support 10 through an adjacent gear reduction device 14. The decorating shaft 12 carries a banding wheel 15, the nature of which will be set forth hereinafter.

Secured to the decorating shaft 12 adjacent the rear end thereof is a gear 16 which meshes with a gear 17 mounted on a hollow shaft 18 (see also Fig. 2), the rear end of which is closed. The shaft 18 is capable of tilting movement and toward this end is mounted in a tiltable bearing 19 having rearwardly extending diverging arms 21 integrally formed thereon, the rear ends of the arms 21 being pivotally supported on stub shafts 22 carried at the upper ends of respective standards 23 mounted on the support 10. It is to be noted that the axis of tilting movement of the shaft 18 passes through the gear 17 and intersects the axis thereof. Thus by forming the peripheral teeth of the gear 17 with a curvature, the radius of which is equal to the radius of the gear 17, tilting of the shaft 18 may be accomplished without disengaging the gears 16 and 17.

In order to manually tilt the shaft 18, a tubular casing 24 (see also Fig. 3) surrounds the shaft 18, is supported thereon by means of anti-friction bearings 25 held in position on the shaft by means of spanner nuts 26, and has secured thereto a bracket 27 from which there extends forwardly an operating rod 28. A coil spring 29 secured at one end to a sleeve 30 mounted on the shaft 18 and at its other end to a lug 31 formed on the platform 10 serves to yieldingly lower the rear end of the shaft 18 and cause the forward end thereof to normally occupy an elevated position.

A chuck assembly 32 is mounted on the forward end of the shaft 18 and overlies the banding wheel 15. The chuck assembly comprises a disk 33 which is secured to the shaft and which is provided with a face plate 34 which is formed of rubber or other resilient material, against which the rim portion of a cup C or other article undergoing decoration is adapted to bear. The forward end of the hollow shaft 18 is closed by means of a cap 35. A vacuum port 36 is formed in the side wall of the shaft 18 near the cap 35 and is adapted to be closed by a sleeve 37 which is slidable on the shaft 18 and which has mounted thereon a centering device 38 over which the article undergoing decoration is placed and which may be formed of wood or other relatively soft material. A coil spring 39 surrounding the shaft 18 serves to normally urge the centering device 38 forwardly on the shaft so that the sleeeve 37 bears against the cap 35 and closes the vacuum port 36.

In order to maintain the articles C in operative decorating position on the chuck assembly 32, means is provided for exhausting the air from the space enclosed by the articles and the resilient face plate 34. Toward this end vacuum pressure is applied to the interior of the hollow shaft 18 from a flexible vacuum hose 41 by means of a suitable packing gland assembly 42 (Fig. 3) which surrounds the shaft 18 and which is contained within the bearing 19. The flexible vacuum hose 41 is connected through a treadle operated valve 43 (Fig. 1) disposed beneath the platform 10 to a conduit 44 leading to a source of vacuum pressure (not shown). The valve 43 is connected through a link 45 to a treadle mechanism 46 and is provided with a core 47 having a passage 48 therein which, when the treadle mechanism is in its depressed position as shown by the full-line position of Fig. 1, establishes communication between the flexible vacuum hose 41 and the vacuum supply conduit 44. The valve 43 is provided with a port 49 communicating with the atmosphere and, when the treadle mechanism is in its normal position as shown by the dotted line position thereof, the passage 49 in the core 47 establishes communication between the vacuum conduit 41 and the atmosphere to admit atmospheric pressure to the interior of the hollow shaft 18.

Still referring to Fig. 1, the banding wheel 15, previously referred to, is mounted on the hollow shaft 12 beneath the chuck assembly 32 and is held against axial shifting by means of clamping collars 51 and clamping nuts 52. The banding wheel 15 is adapted to make tangential rolling line contact with the articles C supported in the chuck assembly 32 when the hollow shaft 18 is tilted forwardly of the apparatus with the forward end thereof lowered. Accordingly, the diameters of the gears 16 and 17, the number of teeth thereon, and the diameter of the banding wheel 15 are calculated in accordance with engineering practice in such a manner that the peripheral speed of the banding wheel equals the peripheral speed of the surface of the article undergoing decoration.

In order that the handles H provided on the articles undergoing decoration shall not present an obstacle to the banding wheel 15, the wheel is provided with a notch 53 in the periphery thereof (Figs. 4, 5 and 6) into which the handle II is adapted to extend once during each revolution of the banding wheel and of the article. The width and depth of the notch 53 are of such magnitude that the banding wheel will clear the handle both as the handle is entering the notch as shown in Fig. 5 and as the handle is leaving the same.

In the introduction of the articles C to the chuck assembly 32, it is necessary that when the articles are finally released by the operator and are engaged and rotated by the chuck, they be properly oriented so that upon each revolution thereof the handles H will enter the notch 53 provided in the banding wheel 15. To automatically effect proper orientation of the articles C, the disk 33 (Fig. 3) has formed thereon a foot 54 which extends forwardly from the periphery thereof and which is adapted to engage the handle H of each article C immediately prior to the application of full vacuum pressure to the space enclosed by the article and face-plate 34. Thus, in the introduction of the article to the chuck 32, the operator, after depressing the foot treadle 46, places the article over the centering device 38 and gradually moves the same rearwardly to unseat the sleeve 37 and partially uncover the vacuum port 36. In this manner a partial vacuum is created which tends to further draw the article toward the face plate 34. However, prior to contact of the rim of the article with the face plate, the foot 54 engages the handle H and applies a torque to the article to rotate the same. The operator then releases the article which is drawn tightly against the face plate 34 properly oriented for cooperation with the banding wheel 15.

Mounted on the platform 10 directly beneath the banding wheel 15 is a reservoir 55 adapted to contain a supply body of the decorating material with which the cups or other articles are banded. The banding wheel 15 extends into the reservoir 55 beneath the level of decorating material therein and is adapted upon rotation thereof to transfer decorating material from the reservoir to the surface of the articles in the usual manner of banding. Inasmuch as the shafts 12 and 18 are driven in synchronism, and the peripheral speed of the banding wheel 15 and of the surface of the articles on the chuck assembly 32 is the same, the banding wheel will, upon lowering of the articles C into engagement therewith in the manner previously described, apply an interrupted band of decorating material to the articles, the interrupted ends of which will occupy relative positions on opposite sides of the handles H in close proximity thereto.

Experience has shown that, if the banding wheel 15 is of uniform thickness throughout, decorating material will accumulate near the interrupted peripheral regions of the wheel and will cause spreading of the material on the surface of the articles at the interrupted ends of the band. In order to overcome this objectionable phenomenon, the opposed edges of the notch 53 are beveled as at 61, the beveled surfaces forming therebetween sharp edges 62. When these edges have been thus beveled, the interrupted ends of the applied band are clearly defined and taper to opposed points 63.

In Fig. 8 a modified form of banding wheel 15' is shown in which the bevelled edges 64 do not form therebetween sharp edges but, on the contrary, form therebetween blunt opposed edges on the inside of the notch, one of which is shown at 65 in Fig. 8. With such a construction, the tendency for the decorating material to spread at the interrupted ends of the applied band is greatly reduced, and any spreading that may occur will not extend beyond the parallel confines of the band body.

Operation of the machine

In the actual decoration of the cups C or other articles, the operator first depresses the treadle mechanism 46 to actuate the valve 43 and apply a vacuum to the interior of the hollow shaft 18. A cup is then inserted over the centering device 38 with its rim portion facing the resilient face plate 34. A slight pressure is applied to the centering device sufficient to partially uncover the port 36 whereupon vacuum pressure is applied to the interior of the article and tends to draw the article further toward the face plate 34. Inasmuch as the shaft 18 rotates continuously, the foot 54 formed on the disk 33 engages the handle H of the article and at this point the operator releases the article. The partial vacuum created within the article draws the latter toward the face plate and fully uncovers the port 36, thus permitting full line vacuum to be applied to the interior of the article when the rim thereof engages the face plate. By means of the operating rod 28, the shaft 18 is tilted forwardly to lower the chuck assembly 32 and article C into decorating position with the article in contact with the banding wheel, properly oriented so that the handle H thereof will register with the notch 53 in the manner previously described. Upon completion of the banding operation, the operator merely releases the treadle 46 to shut off the vacuum supply to the interior of the shaft 18. The article which has been banded, having no vacuum pressure support in the chuck assembly 32 is released and removed by the operator.

Modifications may be resorted to within the spirit and scope of the appended claims.

I claim:

1. A banding disk for transferring decorating material to the curved surfaces of cups and like articles having handles by direct tangential rolling line contact therewith, said disk having a clearance notch formed in the peripheral regions thereof for register with the handle of an article undergoing decoration, the peripheral cylindrical edge of said disk being interrupted by the notch and the interrupted ends of said edge tapering inwardly toward a common plane.

2. A banding disk for transferring decorating material to the curved surfaces of cups and like articles having handles by direct tangential rolling line contact therewith, said disk having a clearance notch formed in the peripheral regions thereof for register with the handle of an article undergoing decoration, the side walls of said notch being beveled.

3. A banding disk for transferring decorating material to the curved surfaces of cups and like articles having handles by direct tangential rolling line contact therewith, said disk having a clearance notch formed in the peripheral regions thereof for register with the handle of an article undergoing decoration, the side walls of said notch being beveled and defining between the beveled portions a pair of opposed sharp edges.

4. A banding disk for transferring decorating material to the curved surfaces of cups and like articles having handles by direct tangential rolling line contact therewith, said disk having a clearance notch formed in the peripheral regions thereof for register with the handle of an article undergoing decoration, the side walls of said notch being reduced in thickness relative to the thickness of the remainder of the disk.

5. In an apparatus for banding hollow ware, a banding disk, means for supporting said disk for rotation about an axis, a hollow shaft mounted for rotation about an axis parallel to the axis of rotation of said disk, a vacuum chuck for supporting an article to be banded in contact with the disk, said chuck being mounted on the hollow shaft and including a face plate against which the rim of the article is adapted to bear during the banding operation, there being a port in the side wall of said shaft establishing communication between the interior of the hollow shaft and the space enclosed by the article and face plate when the former is mounted on the chuck, a centering device for centering the article on the chuck, said centering device being slidable on the shaft and normally closing said port, said centering device being adapted to be moved on the shaft to open said port when engaged by the article, means for connecting the interior of the hollow shaft to a source of vacuum, and means for rotating the hollow shaft.

6. In an apparatus for banding the peripheral curved surfaces of cups and like articles having handles, a rotatable shaft, a banding disk mounted on said shaft, said disk being provided with a clearance notch in the peripheral regions thereof, a hollow rotatable shaft, means for supporting said hollow shaft for tilting movement about a transverse axis, means for tilting said hollow shaft, a vacuum chuck mounted on the hollow shaft and communicating with the interior thereof, said chuck being movable toward and away from the banding disk upon tilting of the hollow shaft, said chuck including a face plate against which the rim of an article manually applied to the chuck is adapted to bear, a foot carried by said chuck eccentrically of the face plate and adapted to engage the handle of an article manually applied to the chuck and held against rotation, means for connecting the interior of the hollow shaft to a source of vacuum, and means for rotating said shafts in opposite directions in synchronism.

7. In an apparatus for banding hollow ware, a shaft mounted for rotation about a horizontal axis, a reservoir disposed beneath said shaft and adapted to contain a supply of liquid banding composition, a banding disk mounted on the shaft and extending into the reservoir, means for rotating said shaft continuously, a gear on the shaft, a second shaft disposed above the first mentioned shaft, means mounting said second shaft for tilting movement about a horizontal axis at right angles to the axis of the first mentioned shaft, a gear mounted on the second mentioned shaft in the vicinity of the axis of tilting thereof, the teeth on the latter gear being curved and in constant mesh with the other gear, a chuck on the second shaft movable toward and away from the banding disk upon tilting movement of the latter shaft to move an article supported thereon into and out of decorating engagement with the banding disk, and means normally tilting the second shaft to a position wherein an article on the chuck is out of engagement with the banding disk.

HAROLD R. SCHUTZ.